US005686550A

United States Patent [19]
Noto et al.

[11] Patent Number: 5,686,550
[45] Date of Patent: Nov. 11, 1997

[54] HIGH-MOLECULAR WEIGHT POLYORGANOSILYL SILICATE AND PROCESS FOR PRODUCING THE SAME

[75] Inventors: Yoshifumi Noto, Saitama; Koichiro Matsuki, Chiba, both of Japan

[73] Assignee: Dainippon Ink and Chemicals, Inc., Tokyo, Japan

[21] Appl. No.: 410,514

[22] Filed: Mar. 24, 1995

[30] Foreign Application Priority Data

Mar. 28, 1994 [JP] Japan .................................. 6-057115
Feb. 10, 1995 [JP] Japan .................................. 7-022720

[51] Int. Cl.$^6$ .................................................. C08G 77/18
[52] U.S. Cl. ........................... 528/39; 556/455; 528/10; 106/287.12; 106/287.13; 106/287.16
[58] Field of Search ............................ 556/455; 528/39, 528/10; 106/287.12, 287.13, 287.16

[56] References Cited

U.S. PATENT DOCUMENTS

| | | | |
|---|---|---|---|
| 2,416,503 | 2/1947 | Trautman et al. | 528/39 |
| 2,698,314 | 12/1954 | Rust | 528/39 |
| 3,250,743 | 5/1966 | Feltzen et al. | 528/39 |
| 3,615,272 | 10/1971 | Collins et al. | 528/31 |
| 4,510,283 | 4/1985 | Takeda et al. | 524/356 |
| 5,011,901 | 4/1991 | Fukutani | 528/42 |
| 5,047,492 | 9/1991 | Weidner et al. | 528/15 |
| 5,070,175 | 12/1991 | Tsumura et al. | 528/12 |
| 5,110,890 | 5/1992 | Butler | 528/12 |
| 5,256,741 | 10/1993 | Ogawa et al. | 525/477 |
| 5,399,648 | 3/1995 | Yamamoto et al. | 528/12 |

*Primary Examiner*—Margaret Glass
*Attorney, Agent, or Firm*—Armstrong, Westerman, Hattori, McLeland & Naughton

[57] ABSTRACT

A high-molecular weight polyorganosilyl silicate having a weight-average molecular weight of 30,000 to 2,000,000 on polystyrene conversion in which the repeating units form a ladder structure through siloxane bonding, and the ladder structures are further bonded together through siloxane bonding is disclosed. Also disclosed is a process for producing the polymer. The polymer is useful as a coating material or a film-forming material to provide a coating film or a film having excellent electrical characteristics, weather resistance, adhesion, water repellency, processability and scratch resistance.

5 Claims, 7 Drawing Sheets

HIGH-MOLECULAR WEIGHT POLYORGANOSILYL SILICATE AND PROCESS FOR PRODUCING THE SAME

FIELD OF THE INVENTION

This invention relates to a high-molecular weight polyorganosilyl silicate useful in various industrial fields and a process for producing the same. More particularly, it relates to a high-molecular weight polyorganosilyl silicate which is useful as a coating material having excellent electrical characteristics required in application to electronic parts, wiring boards, etc., such as heat resistance, insulating properties and low dielectric constant; a coating material applicable to various substrates including metals, plastics, and glass to provide a coating film excellent in weather resistance, adhesion, water repellency, processability and scratch resistance; or a film- or sheet-forming material.

BACKGROUND OF THE INVENTION

A polyorganosilyl silicate obtained by organosilylation of sodium silicate (water glass) is known as a water repellant, but production of high-molecular weight polyorganosilyl silicates having a molecular weight exceeding 20,000 has not yet been reported.

JP-B-49-40639 (the term "JP-B" as used herein means an "examined Japanese patent publication") discloses that trimethylsilylation of water glass provides a polyorganosilyl silicate having a ladder structure. However, with no functional group necessary for molecular weight increase, the molecular weight of the polytrimethylsilyl silicate obtained is governed by the molecular weight of the sodium silicate component of water glass and therefore does not substantially exceed about 7,000.

JP-B-53-39278 reports production of a polyorganosilyl silicate having a molecular weight of about 1,000 to 20,000. However, the process disclosed in JP-B-53-39278 involves gelation in the molecular weight increasing reaction probably, for one thing, because of the influences of low-molecular weight silicate components and impurities, failing to provide polyorganosilyl silicates having a high molecular weight sufficient for use as a coating material or film-forming material.

SUMMARY OF THE INVENTION

An object of the present invention is to provide a high-molecular weight polyorganosilyl silicate having a weight-average molecular weight of not less than 30,000 and thus suitable as a coating material or a film-forming material.

Another object of the present invention is to provide a process for producing such a high-molecular weight polyorganosilyl silicate.

As a result of extensive investigations, the present inventors have found that what we call purified sodium silicate, which is obtained from an inexpensive sodium silicate component (water glass) by fractional precipitation with a mixed solvent, serves for accomplishment of the objects of the present invention advantageously.

The present inventors have found that an extremely high-molecular weight polyorganosilyl silicate having a weight-average molecular weight (Mw) of 30,000 to 2,000,000 on polystyrene conversion and therefore useful as a coating material or a film-forming material can be obtained by (A) a process comprising reacting purified sodium silicate, which has been freed of low-molecular weight components and impurities by the above-mentioned purification of sodium silicate, with an organosilylating agent in a mixed solvent of water and a non-aqueous solvent to obtain a partially silylated organosilicic acid polymer having a weight-average molecular weight (Mw) of 2,000 to 6,000 on polystyrene conversion, adding thereto an organic polar solvent if desired, neutralizing the polymer with an acid, and heat treating the polymer or (B) a process comprising reacting the above-mentioned purified sodium silicate with an organosilane compound in a solvent containing water to obtain a high-molecular weight partially silylated organosilicic acid polymer having a weight-average molecular weight (Mw) of not less than 25,000 on polystyrene conversion and further reacting the polymer with an organosilylating agent in the presence of an acid or an organic polar solvent. The present invention has been completed based on this finding.

The present invention relates to a high-molecular weight polyorganosilyl silicate having a weight-average molecular weight (Mw) of 30,000 to 2,000,000 on polystyrene conversion and comprising the repeating units of formula (I):

wherein $R_1$ and $R_2$, which may be the same or different, each represent a hydrogen atom or a substituted silyl group represented by formula $(R_3)(R_4)(R_5)Si-$, a hydrogen atom or the substituted silyl group in every repeating unit being selected arbitrarily, wherein $R_3$ represents an alkyl group or a phenyl group, and $R_4$ and $R_5$, which may be the same or different, each represent an alkyl group, an alkenyl group, a phenyl group or a hydroxyl group; and the molar ratio of silanol group to $(R_1+R_2)$ in the polyorganosilyl silicate is from 0/100 to 40/60, wherein the repeating units of formula (I) are bonded together through siloxane bonding to form a ladder structure, and the ladder structures are bonded together through siloxane bonding.

The present invention encompasses a partially silylated organosilicic acid polymer having a weight-average molecular weight (Mw) of 2,000 to 6,000 on polystyrene conversion and comprising the repeating units of formula (II):

wherein $R_1$ and $R_2$, which may be the same or different, each represent a hydrogen atom, a sodium atom or a substituted silyl group represented by formula $(R_3)(R_4)$ ($R_5$)Si—, a hydrogen atom, a sodium atom or the substituted silyl group in every repeating unit being selected arbitrarily, wherein $R_3$ represents an alkyl group or a phenyl group, and $R_4$ and $R_5$, which may be the same or different, each represent an alkyl group, an alkenyl group, a phenyl group or a hydroxyl group, wherein the repeating units of formula (II) are bonded together through siloxane bonding to form a ladder structure, and the ladder structures are bonded together through siloxane bonding.

The present invention also encompasses a partially silylated organosilicic acid polymer having a weight-average molecular weight (Mw) of 2,000 to 6,000 on polystyrene conversion and comprising the repeating units of formula (II), the repeating units of formula (II) forming a ladder structure through siloxane bonding and the ladder structures being bonded together through siloxane bonding, which is obtained by reacting purified sodium silicate and an organosilylating agent in a mixed solvent of water and a nonaqueous solvent.

The present invention further relates to (A) a process for producing a high-molecular weight polyorganosilyl silicate having a weight-average molecular weight (Mw) of not less than 30,000 on polystyrene conversion, which comprises neutralizing a partially silylated organosilicic acid polymer with an acid, the polymer having a weight-average molecular weight (Mw) of 2,000 to 6,000 on polystyrene conversion and comprising the repeating units of formula (II), wherein the repeating units of formula (II) are bonded together through siloxane bonding to form a ladder structure, and the ladder structures are bonded together through siloxane bonding, and wherein the polymer is obtained by reacting purified sodium silicate and an organosilylating agent in a mixed solvent of water and a nonaqueous solvent, and then subjecting the resulting polymer to a heat treatment.

The present invention includes a high-molecular weight partially silylated organosilicic acid polymer having a weight-average molecular weight (Mw) of not less than 25,000 on polystyrene conversion and comprising the repeating units represented by formula (III):

(III)

wherein $R_1$ and $R_2$, which may be the same or different, each represent a hydrogen atom, a sodium atom or a substituted silyl group represented by formula $(R_6)_m$ $(R_7)_{3-m}$Si—, a hydrogen atom, a sodium atom or the substituted silyl group in every repeating unit being selected arbitrarily, wherein $R_6$ represents an alkyl group or an aryl group, $R_7$ represents a halogen atom or an alkoxy group, and m represents 0, 1 or 2, wherein the repeating units of formula (III) are bonded together through siloxane bonding to form a ladder structure, and the ladder structures are bonded together through siloxane bonding.

The present invention also includes a high-molecular weight partially silylated organosilicic acid polymer having a weight-average molecular weight (Mw) of not less than 25,000 and comprising the repeating units of formula (IV):

(IV)

wherein $R_1$ and $R_2$, which may be the same or different, each represent a hydrogen atom, a sodium atom or a substituted silyl group represented by formula $(R_6)_m$ $(R_7)_{3-m}$—Si—, a hydrogen atom, a sodium atom or the substituted silyl group in every repeating unit being selected arbitrarily, wherein $R_6$ represents an alkyl group or an aryl group, $R_7$ represents a halogen atom or an alkoxy group, and m represents 0, 1 or 2 which is obtained by reacting purified sodium silicate with an organosilane compound represented by formula (V) in a solvent containing water:

$$(R_6)_m(R_7)_{4-m}Si \qquad (V)$$

wherein $R_6$, $R_7$, and m have the same meaning as defined above.

The present invention furthermore relates to (B) a process for producing a high-molecular weight polyorganosilyl silicate having a weight-average molecular weight of not less than 30,000 on polystyrene conversion, comprising reacting a high-molecular weight partially silylated organosilicic acid polymer having a weight-average molecular weight of not less than 25,000 on polystyrene conversion and comprising the repeating units of formula (IV), which is obtained by reacting purified sodium silicate with an organosilane compound represented by formula (V) in a solvent containing water, with an organosilylating agent in the presence of an acid and an organic polar solvent.

The following embodiments (1) to (6) of the above-described processes (A) or (B) are also included under the scope of the present invention.

1) Process (A) or (B), wherein the purified sodium silicate is obtained by removing solvent-soluble components from sodium silicate using a mixed solvent of a water-soluble organic solvent and water.
2) Process (A), wherein the degree of silylation of the partially silylated organosilicic acid polymer is from 40 to 99.8 mol % per mole of purified sodium silicate used.
3) Process (B), wherein the degree of silylation of the high-molecular weight partially silylated organosilicic acid polymer is from 0.6 to 15 mol % per mole of purified sodium silicate used.
4) Process (A) or (B), wherein an organosilylating agent is added to a mixed solution of sodium silicate to cause partial silylation.
5) Process (A), wherein the heat treatment is conducted at a temperature of from 25° C. up to the boiling point of the reaction solvent.
6) Process (B), wherein the organic polar solvent is at least one member selected from the group consisting of alcohols, ethers, ketones, and esters.

The present invention additionally provides a process for producing purified sodium silicate comprising dispersing sodium silicate in a mixed solvent of water and at least one water-soluble organic solvent incapable of dissolving sodium silicate and selected from the group consisting of alcohols, alicyclic ethers, and aprotic solvents to remove the components soluble in the mixed solvent.

The present invention still additionally provides a coating material, a water repellant, and an insulating film essentially comprising the high-molecular weight polyorganosilyl silicate having a weight-average molecular weight of not less than 30,000 on polystyrene conversion according to the present invention.

DETAILED DESCRIPTION OF THE INVENTION

According to the present invention, a solvent-soluble high-molecular weight polyorganosilyl silicate can be obtained by starting with purified sodium silicate freed of low-molecular weight components or impurities that would interfere with increase of molecular weight and also by adjusting the degree of silylation of the silylated organosilicic acid polymer.

Figure 1:
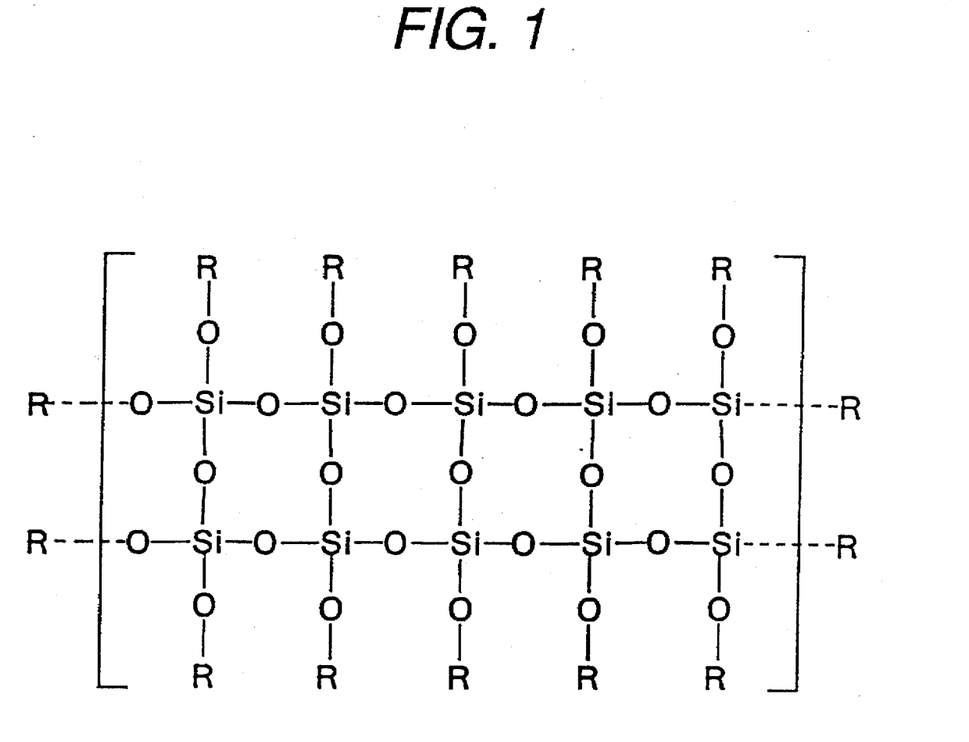
FIG. 1 is a scheme illustrating a ladder structure of the polyorganosilyl silicate of the present invention, in which R is a hydrogen atom or a substituted silyl group.
Figure 2:
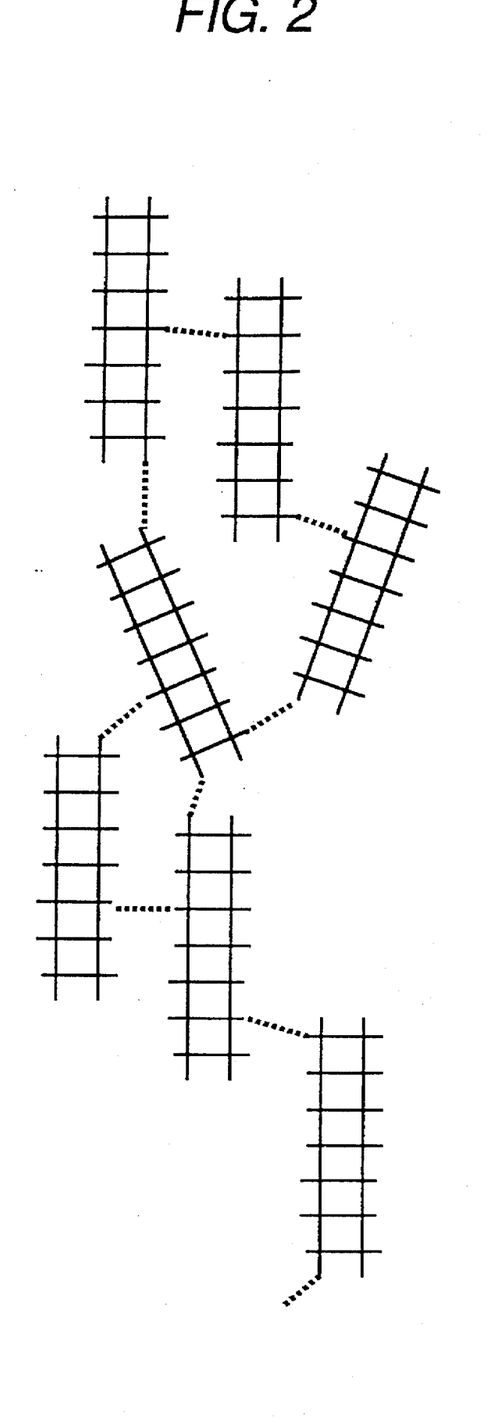
FIG. 2 is a scheme illustrating ladder structures of FIG. 1 bonded together through siloxane bonding.

According to the process of the present invention, the ladder structures formed of the repeating unit of formula (I) undergo silanol condensation between hydrogen atoms represented by $R_1$ or $R_2$ and hydroxyl groups represented by ($R_4$) and/or ($R_5$) in the substituted silyl group ($R_3$)($R_4$)($R_5$)Si— and are thereby linked together as schematically illustrated in FIGS. 1 and 2 to provide a high-molecular weight polyorganosilyl silicate having a weight-average molecular weight (hereinafter abbreviated as Mw) of 30,000 to 2,000,000, preferably 30,000 to 1,500,000, still preferably 30,000 to 1,000,000.

Figure 3:
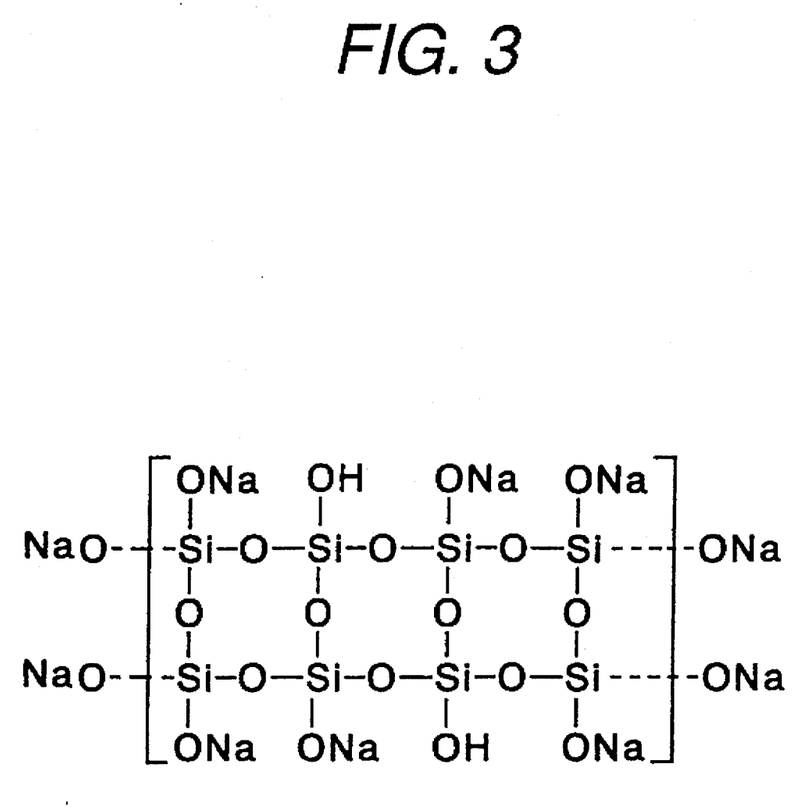
FIG. 3 is a scheme illustrating the structure of sodium silicate.

Sodium silicate which can be used as a raw material in the present invention is manufactured in quantity on an industrial scale, and JIS specification grades are easily available on the market at low prices. Among them, water glass JIS specification No. 3 represented by $Na_2O \cdot 3SiO_2$ is preferred in the present invention for its ladder structure. The scheme illustrating the structure of sodium silicate is shown in FIG. 3.

The term "purified sodium silicate" as used herein refers to a product obtained by adding to an aqueous solution of water glass a water-soluble organic solvent to conduct fractional precipitation at a prescribed mixed solvent composition. The water-soluble organic solvent is added in an amount sufficient for dissolving low-molecular weight components and impurities that would interfere with increase of molecular weight. The amount is usually from 5 to 50% by weight, preferably 8 to 40% by weight, based on the total amount of the mixed solvent, while varying depending on the concentration of the aqueous sodium silicate solution to be treated.

If the amount of the water-soluble organic solvent is less than 5% by weight, the recovery of purified sodium silicate is reduced. If it exceeds 50% by weight, components which will hinder the increase of molecular weight are also precipitated. By this purification treatment, low-molecular weight components of sodium silicate which hinder increase of molecular weight, specifically impurities having a weight-average molecular weight of not greater than 500 can be removed effectively.

The purified sodium silicate thus obtained has a relatively narrow molecular weight distribution as can be expressed as a ratio of weight-average molecular weight (Mw) to number-average molecular weight (Mn) (hereinafter referred to as an Mw/Mn ratio) of not more than 1.8, preferably from 1.6 to 1.1, still preferably from 1.4 to 1.1, and particularly preferably from 1.3 to 1.1.

The water-soluble organic solvents which can be used for fractional precipitation include methyl alcohol, ethyl alcohol, isopropyl alcohol, acetone, tetrahydrofuran, N,N-dimethylformamide, and N-methylpyrrolidone. These water-soluble organic solvents serve as a non-solvent for sodium silicate.

Process (A) for producing a high-molecular weight polyorganosilyl silicate having an Mw of not less than 30,000 comprises neutralizing a partially silylated organosilicic acid polymer having an Mw of 2,000 to 6,000 on polystyrene conversion, which is obtained by reacting purified sodium silicate and an organosilylating agent in a mixed solvent of water and a non-aqueous solvent, with an acid, if desired adding an organic polar solvent, and subjecting the polymer to a heat treatment to increase the molecular weight.

Process (B) for producing a high-molecular weight polyorganosilyl silicate having an Mw of not less than 30,000 on polystyrene conversion comprises reacting purified sodium silicate with an organosilane compound represented by formula (V) in a solvent containing water, and reacting the resulting high-molecular weight partially silylated organosilicic acid polymer having an Mw of not less than 25,000 on polystyrene conversion with an organosilylating agent in the presence of an acid and an organic polar solvent.

Describing process (A) more specifically, a non-aqueous solvent is added to an aqueous solution of purified sodium silicate having a concentration of 3 to 40% by weight, preferably 5 to 20% by weight, and an organosilylating agent either as it is or as diluted with an organic solvent is added dropwise to the solution while stirring to allow the mixture to react at room temperature under atmospheric pressure for 30 minutes to 10 hours, preferably 1 to 7 hours to obtain a solution of a partially silylated organosilicic acid polymer having an Mw of 2,000 to 6,000 on polystyrene conversion. If desired, the reaction may be carried out under heating and/or pressure.

Then the reaction mixture is neutralized by addition of an acid, such as hydrochloric acid, sulfuric acid or acetic acid to adjust to a pH of about 5 or less. If desired, an organic polar solvent may be added thereto. The neutralization can be carried out by a manner in which an acid and, if desired, an organic polar solvent are successively added to the partially silylated organosilicic acid polymer solution or a manner in which the polymer solution is added to a mixed solution of an acid and an organic polar solvent.

The organic polar solvent is added in order to prevent the partially silylated organosilicic acid polymer solution from assuming an emulsified or suspended state on being neutralized with an acid depending on the degree of silylation of the polymer. After the neutralization, the reaction mixture is allowed to undergo silanol condensation at 25° to 70° C., preferably 30° to 60° C., for 30 minutes to 10 hours, preferably 1 to 6 hours.

Describing process (B) more specifically, purified sodium silicate is dissolved in a solvent containing water in a concentration of 3 to 40% by weight, preferably 5 to 20% by weight, and an organosilane compound of formula (V) either as it is or as diluted with an organic solvent is added to the solution in an amount of 0.6 to 15 mol %, preferably 0.8 to 12 mol %, per mole of purified sodium silicate. The mixture is allowed to react under stirring at a temperature of from room temperature up to the boiling point of the reaction solvent used, preferably from 25° to 70° C., under atmospheric pressure for a period of from 30 minutes to 10 hours, preferably from 1 to 7 hours, to obtain a solution of a high-molecular weight partially silylated organosilicic acid polymer having an Mw of not less than 25,000 on polystyrene conversion. If desired, the reaction may be effected under pressure.

To the polymer solution are added while stirring an acid in an amount of 1.00 to 1.20 times, preferably 1.00 to 1.10 times, the acid equivalent necessary to neutralize the unreacted sodium silicate in the reaction mixture and an organic polar solvent in an amount of 20 to 80% by weight, preferably 30 to 70% by weight, based on the total reaction mixture. Alternatively, the polymer is added to the mixed solution of the acid and the organic polar solvent while stirring.

To the mixture is further added an organosilylating agent dropwise, followed by allowing the mixture to react at a temperature of from 25° C. up to the boiling point of the reaction solvent, preferably from 30° to 70° C., for a period of from 30 minutes to 10 hours, preferably from 1 to 6 hours.

Whichever process, (A) or (B), may be followed, the reaction mixture after completion of the reaction is separated into an organic solvent phase and an aqueous phase. The aqueous phase is discarded to recover the organic solvent phase containing the polymer. Depending on the kind or amount of the solvent used in the reaction or the degree of silylation, the reaction mixture sometimes assumes a suspended state. This being the case, it is preferable to add an organic polar solvent, such as an alcohol, an ether, a ketone or an ester, to the reaction mixture before liquid-liquid separation.

The thus recovered organic solvent phase is washed with water and subjected to fractional dissolution or solvent distillation to recover the polymer as solid. The organic solvent phase may be subjected to solvent exchange to provide a polymer solution for use as such.

Examples of the non-aqueous solvents which can be used in the present invention include ketones, such as methyl isobutyl ketone and methyl isopropyl ketone; ethers, such as diethyl ether and isopropyl ether; and aromatic hydrocarbons, such as benzene, toluene and xylene. The non-aqueous solvent is used in an amount of 20 to 80% by weight, preferably 30 to 70% by weight, based on the total reaction mixture, though varying depending on the kind of the solvent and the degree of silylation.

Examples of the organic polar solvents which can be used in the present invention include alcohols, such as methyl alcohol, ethyl alcohol, isopropyl alcohol, isobutyl alcohol and 1,2-propanediol; ethers, such as diethyl ether, dioxane and tetrahydrofuran; ketones, such as acetone, methyl ethyl ketone and cyclohexanone; and esters, such as methyl acetate, ethyl acetate and isopropyl acetate.

While the amount of the organic polar solvent to be used cannot be generally specified, for it varies according to the degree of silylation of the partially silylated organosilicic acid polymer, the kind and amount of the non-aqueous solvent, and the like, it is usually in the range of from 5 to 80% by weight, preferably from 10 to 80% by weight, based on the total reaction mixture. If the amount of the organic polar solvent is less than 5% by weight, the reaction product tends to precipitate. Amounts exceeding 80% by weight cause no particular hindrance to the production but produce no further effect.

The organosilylating agent which can be used in the present invention includes compounds represented by formula (VI):

$$(R_3)(R_4)_n(R_5)_{3-n}\text{Si} \qquad (VI)$$

wherein ($R_3$) represents an alkyl group, e.g., methyl, ethyl, propyl, butyl, pentyl, hexyl, heptyl, octyl, nonyl, decyl or dodecyl; an alkenyl group, e.g., vinyl or acryl, an aryl group, e.g., phenyl or tolyl, or a substituted organic group such as glycidyl or β-carboxyethyl; ($R_4$) represents an alkyl group, e.g., methyl, ethyl, propyl, butyl, pentyl, hexyl, heptyl, octyl, nonyl, decyl or dodecyl; or an aryl group, e.g., phenyl or tolyl; ($R_5$) represents a halogen atom, e.g., chlorine or bromine; or an alkoxy group, e.g., methoxy or ethoxy; and n represents 0, 1 or 2.

Preferred of the organosilylating agents of formula (VI) are those containing an alkyl group having 1 to 5 carbon atoms or a phenyl group for ease of synthesis and availability. Typical examples of useful organosilylating agents are trimethylchlorosilane, trimethylethoxysilane, dimethyldichlorosilane, methyltrichlorosilane, triethylchlorosilane, phenyldimethylchlorosilane, phenyldimethoxysilane, diphenyldichlorosilane, vinyldimethylchlorosilane, vinyldiethoxysilane, glycidyldimethylchlorosilane, and β-carboxyethyldimethylsilane. These organosilylating agents may be used either individually or as a combination of two or more thereof.

In process (A), the amount of the organosilylating agent to be used in the synthesis of the partially silylated organosilicic acid polymer usually ranges from 40 to 99.8 mol %, preferably from 50 to 99.5 mol %, per mol of purified sodium silicate, while varying according to the desired reaction rate in the silylation. If the amount of the organosilylating agent is less than 40 mol %, the reaction tends to be attended by gelation to produce insoluble components. If it exceeds 99.8 mol %, the polymer does not increase in molecular weight.

In process (B), at least one of organosilane compounds represented by formula (V) shown below is used in the silylation.

$$(R_6)_m(R_7)_{4-m}\text{Si} \qquad (V)$$

wherein ($R_6$) represents an alkyl group or an aryl group; ($R_7$) represents a halogen atom or an alkoxy group; and m represents 0, 1 or 2.

In formula (V), ($R_6$) represents an alkyl group, e.g., methyl, ethyl, propyl, butyl, pentyl, hexyl, heptyl, octyl, nonyl, decyl or dodecyl; an alkenyl group, e.g., vinyl or acryl; or an aryl group, e.g., phenyl or tolyl. ($R_7$) represents a halogen atom, e.g., chlorine or bromine, or a hydrolyzable group such as an alkoxy group, e.g., methoxy or ethoxy.

Of the organosilane compounds of formula (V), those containing an alkyl group having 1 to 5 carbon atoms or a phenyl group are preferred for ease of synthesis and availability. Specific examples of the organosilane compounds of formula (V) include trichlorosilane compounds and trialkoxysilane compounds, such as methyltrichlorosilane, ethyltrichlorosilane, isopropyltrichlorosilane, phenyltrichlorosilane, methyltrimethoxysilane, ethyltripropoxysilane, and phenyltriethoxysilane; and dichlorosilane compounds and dialkoxysilane compounds, such as dimethyldichlorosilane, diethyldichlorosilane, dipropyldichlorosilane, diphenyldichlorosilane, dimethyldimethoxysilane, diethyldimethoxysilane, diisopropyldimethoxysilane, diphenyldimethoxysilane, and diethyldipropoxysilane.

The amount of the organosilane compounds to be used in the synthesis of the high-molecular weight partially silylated organosilicic acid polymer in process (B) ranges from 0.6 to 15 mol %, preferably from 0.8 to 12 mol %, per mol of purified sodium silicate. If it is less than 0.6 mol %, the effect of increasing the molecular weight is reduced. If it exceeds 15 mol %, gelation tends to occur during the reaction.

The amount of the organosilylating agent to be used in the silylation of the high-molecular weight partially silylated organosilicic acid polymer in process (B) ranges from 60 to 100 mol % per mole of the non-silylated silicic acid in the polymer. If it is less than 60 mol %, gelation tends to occur during the reaction or purification to produce insoluble components.

The high-molecular weight polyorganosilyl silicate of the present invention having an Mw of not less than 30,000 is excellent in electrical characteristics, water repellency, processability, mechanical characteristics, and adhesion.

More specifically, it has a heat resistance of not lower than 350° C., a surface resistivity of not lower than $10^{16}\Omega$, a volume resistivity of not lower than $10^{17}$ $\Omega$·cm, and a dielectric constant of not higher than 2.4 and is therefore suitable for use as a coating material satisfying the electrical requirements in application to electronic parts, wiring boards, etc., i.e., heat resistance, insulating properties, and low dielectric constant.

Further, it exhibits satisfactory adhesion to various molding materials, such as metals, plastics and glass, and provides a coating film having a contact angle of 95° or more with distilled water as measured at 20° C. with a contact angle measuring device manufactured by Eruma Kogakusha and a pencil hardness of 4H or higher. That is, it exhibits excellent characteristics in water repellency, scratch resistance, weather resistance and the like and is therefore suitable for use as a coating material, a paint, an adhesive or a water repellant.

The high-molecular weight polyorganosilyl silicate of the present invention may be used as dissolved in a solvent or may be formed into filming or sheeting by solution casting to provide a film or sheet with excellent mechanical properties such as hardness and tensile strength, a protective film, and an interlayer film or a gas separation membrane having excellent gas separation performance.

In order to further improve the performance properties such as strength and dimensional stability, various fillers may be added to the high-molecular weight polyorganosilyl silicate of the present invention. Suitable fillers include fibrous fillers, such as glass fiber, carbon fiber, ceramic fiber, aramid fiber, metal fiber, and silicon carbide fiber; and inorganic fillers, such as barium sulfate, calcium sulfate, clay, pyrophyllite, bentonite, sericite, zeolite, mice, talc, attapulgite, ferrite, calcium silicate, calcium carbonate, magnesium carbonate, and glass beads.

When the fibrous filler is added, the added amount is preferably not more than 300 parts by weight, per 100 parts by weight of the high-molecular weight polyorganosilyl silicate. On the other hand, when the inorganic filler is added, the added amount is preferably not more than 80 parts by weight, per 100 parts by weight of the high-molecular weight polyorganosilyl silicate.

If desired, the high-molecular weight polyorganosilyl silicate may be mixed with or have dissolved therein synthetic resins and/or elastomers. Examples of suitable synthetic resins are polyester, polyamide, polyimide, polyetherimide, polycarbonate, polyphenylene ether, polyphenylene sulfide, polysulfone, polyether sulfone, polyether ether ketone, polyether ketone, polytetrafluoroethylene, polydifluoroethylene, polystyrene, ABS resins, epoxy resins, silicone resins, phenolic resins, and urethane resins. Examples of suitable elastomers are polyvinyl chloride elastomers, polyester elastomers, silicone elastomers, polystyrene elastomers, polyolefin elastomers, polyamide elastomers, and polyurethane elastomers.

Although the amount of the synthetic resin and/or elastomer can not be prescribed, usually it is not more than 400 parts by weight per 100 parts by weight of the high-molecular weight polyorganosilyl silicate.

If desired, the high-molecular weight polyorganosilyl silicate of the present invention, or a combination with the synthetic resin and/or elastomer, may further contain generally used additives, such as colorants, heat-proof stabilizers, ultraviolet stabilizers, blowing agents, lubricants, coupling agents, and so on.

The high-molecular weight polyorganosilyl silicate of the present invention, the process for producing the same, and application of the polyorganosilyl silicate will be illustrated in greater detail by way of Examples, but it should be understood that the present invention is not construed as being limited thereto. Unless otherwise specified, all the percents are by weight.

In Examples, weight-average molecular weight (Mw), IR spectrum, $^{13}$C-NMR, $^{1}$H-NMR, $^{29}$Si-NMR, and heating temperature at 10% weight loss were measured as follows.
1) Weight-Average Molecular Weight (Mw):

Measured by gel-permeation chromatography (GPC) on an about 0.1% solution of a sample in tetrahydrofuran using a chromatograph HLC-8020, produced by Tosoh Corp., and gel columns SHODEX AC-803 and 804, produced by Showa Denko K.K.
2) IR Spectrum:

Taken by a micro KBr tablet method with an FT/IR spectrophotometer Model 5M, manufactured by Nippon Bunko Engineering K.K., (the number of scanning times= 100).
3) FT-NMR Spectra of $^{13}$C-NMR, $^{1}$H-NMR and $^{29}$Si-NMR:

Taken with GSX-400 (400 MHz), manufactured by JEOL Ltd., on a sample dissolved in chloroform-d ($CDCl_3$) and having added thereto a standard substance (chloroform ($CHCl_3$) or tetramethylsilane (TMS)).
4) Heating Temperature at 10% Weight Loss:

Measured through thermogravimetric analysis with an apparatus for simultaneous thermogravimetry/differential thermal analysis Model TG/DTA-220, manufactured by Seiko Instruments Inc., under conditions of a nitrogen atmosphere, a temperature of from room temperature up to 1000° C., and a rate of temperature rise of 10° C./min.

EXAMPLES 1 TO 5

Preparation of Purified Sodium Silicate

Commercially available sodium silicate (water glass JIS No. 3; Mw: 2400; Mn: 1100; Mw/Mn=2.18) was 3-fold diluted with distilled water to prepare an aqueous solution having an SiO$_2$ component concentration of 9.8%. To the aqueous solution was added dropwise the water-soluble organic solvent shown in Table 1 in an amount shown in Table 1 (per 100 g of the aqueous solution) while stirring, and the formed precipitate was collected by filtration. An aliquot of the solid was dried to obtain the yield of purified sodium silicate.

An aliquot of the purified sodium silicate and an aliquot of the soluble components (filtrate), trimethylsilylated by Lentz' method, were subjected to GPC to measure the respective molecular weight.

REFERENCE EXAMPLE 1

Silylation by Lentz' method (C. W. Lentz, *Inorg. Chem.*, Vol. 3, p. 574 (1964)) was carried out as follows. To a mixed solution of 3.5 mol of distilled water, 0.9 mol of hydrochloric acid, 2 mol of isopropyl alcohol, and 0.5 mol of hexamethyldisiloxane was added dropwise 53 g of a 1 mol % aqueous solution of sodium silicate (Si: 0.05 mol) while stirring at 23° to 25° C., followed by stirring at 25° C. for 1 hour. The organic layer was separated, 10 g of Amberlite-15E, produced by Rohm & Haas Co., was added thereto, and the mixture was allowed to react at 28° C. for 2 hours. The reaction mixture was filtered, and the solvent was removed by evaporation to obtain a silylated product.

The results of Examples 1 to 5 are shown in Table 1. The soluble components removed in Example 3 had an Mw of 500 and an Mn of 420, giving an Mw/Mn ratio of 1.2.

TABLE 1

| Example No. | Organic Solvent | | Purified Sodium Silicate | | | |
| --- | --- | --- | --- | --- | --- | --- |
| | Kind | Amount (g) | Yield (wt %) | Mw (×10³) | Mn (×10³) | Mw/Mn |
| 1 | methanol | 5 | 46 | 3.4 | 3.0 | 1.13 |
| 2 | methanol | 30 | 94 | 2.6 | 2.2 | 1.20 |
| 3 | methanol | 90 | 97 | 2.5 | 2.1 | 1.19 |
| 4 | acetone | 30 | 92 | 2.6 | 2.2 | 1.20 |
| 5 | dimethyl-formamide | 30 | 95 | 2.6 | 2.1 | 1.24 |

EXAMPLES 6 TO 10

Preparation of Polyorganosilyl Silicate

Each of the purified sodium silicate species obtained in Examples 1 to 5 was re-dissolved in water to prepare an aqueous solution having an SiO$_2$ component concentration of 10%.

In a 1-volume 4-necked flask equipped with a dropping funnel, a thermometer, a condenser, and a stirring rod were charged 250 g of the above prepared aqueous solution and 150 g of methyl isobutyl ketone, and trimethylchlorosilane (hereinafter abbreviated as TMCS) of the amount shown in Table 2 below was added thereto dropwise over 10 to 20 minutes with stirring while maintaining the mixture below 30° C. by cooling. After the addition, the stirring was continued for an additional one hour to obtain a partially silylated organic sodium silicate polymer solution.

The resulting polymer solution was added dropwise to 5% hydrochloric acid-containing isopropyl alcohol (hereinafter abbreviated as IPA) in an amount shown in Table 2. After the addition, the reaction temperature was raised to about 50° C., at which the stirring was continued for 3 hours to complete silanol condensation reaction. The reaction mixture was separated into two layers in a separatory funnel, and the lower aqueous layer was discarded to recover the organic layer containing a polyorganosilyl silicate.

The organic layer was washed twice with the equivalent amount of distilled water by shaking. The organic solvent was removed by evaporation to obtain a tack-free polyorganosilyl silicate in the yield shown in Table 2.

The Mw of the polyorganosilyl silicates obtained are also shown in Table 2. It is seen that all the polymers had an Mw of not less than 30,000.

Figure 4:
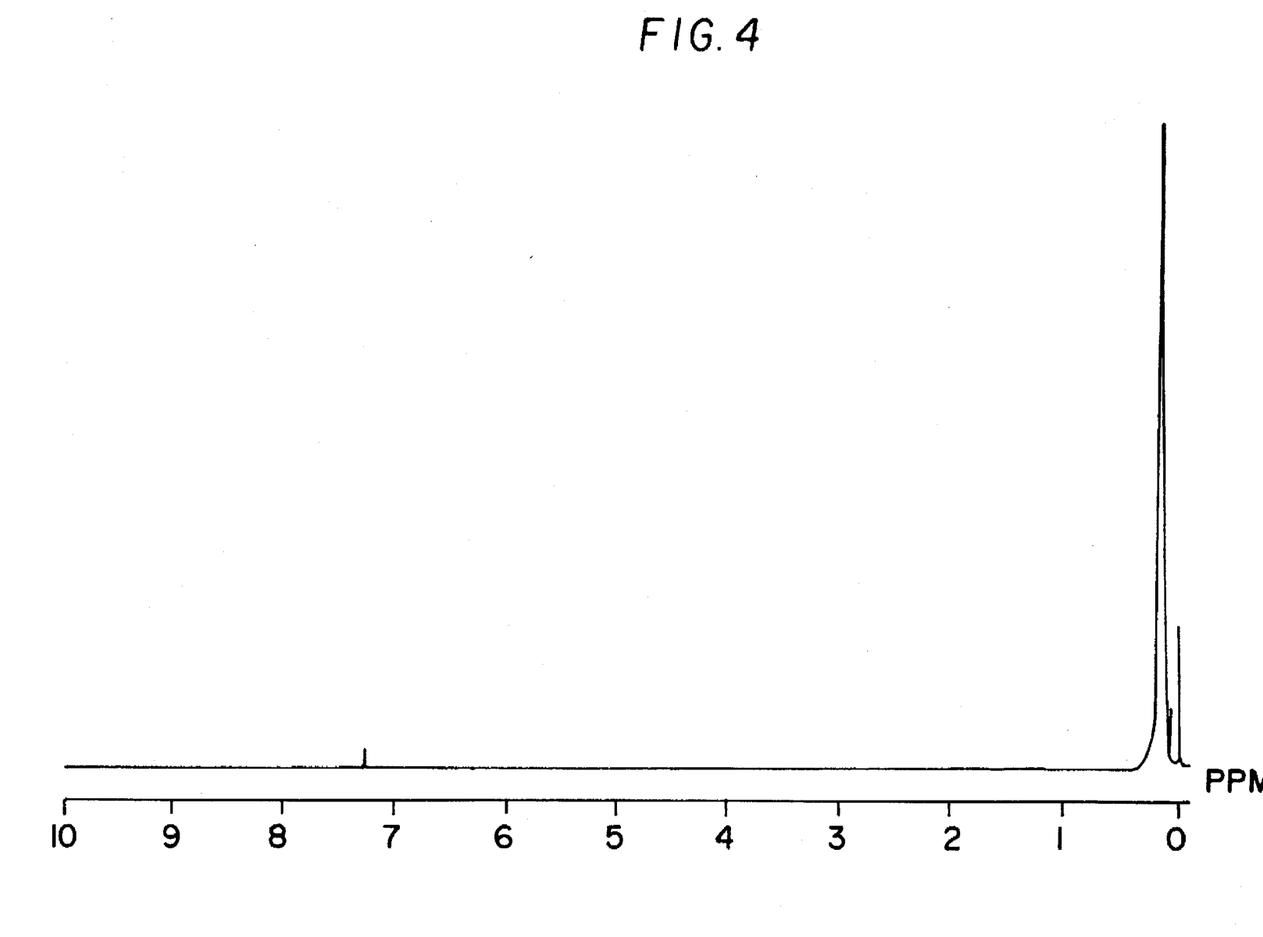
FIG. 4 is the $^1$H-NMR spectrum of the polyorganosilyl silicate prepared in Example 6.
Figure 5:
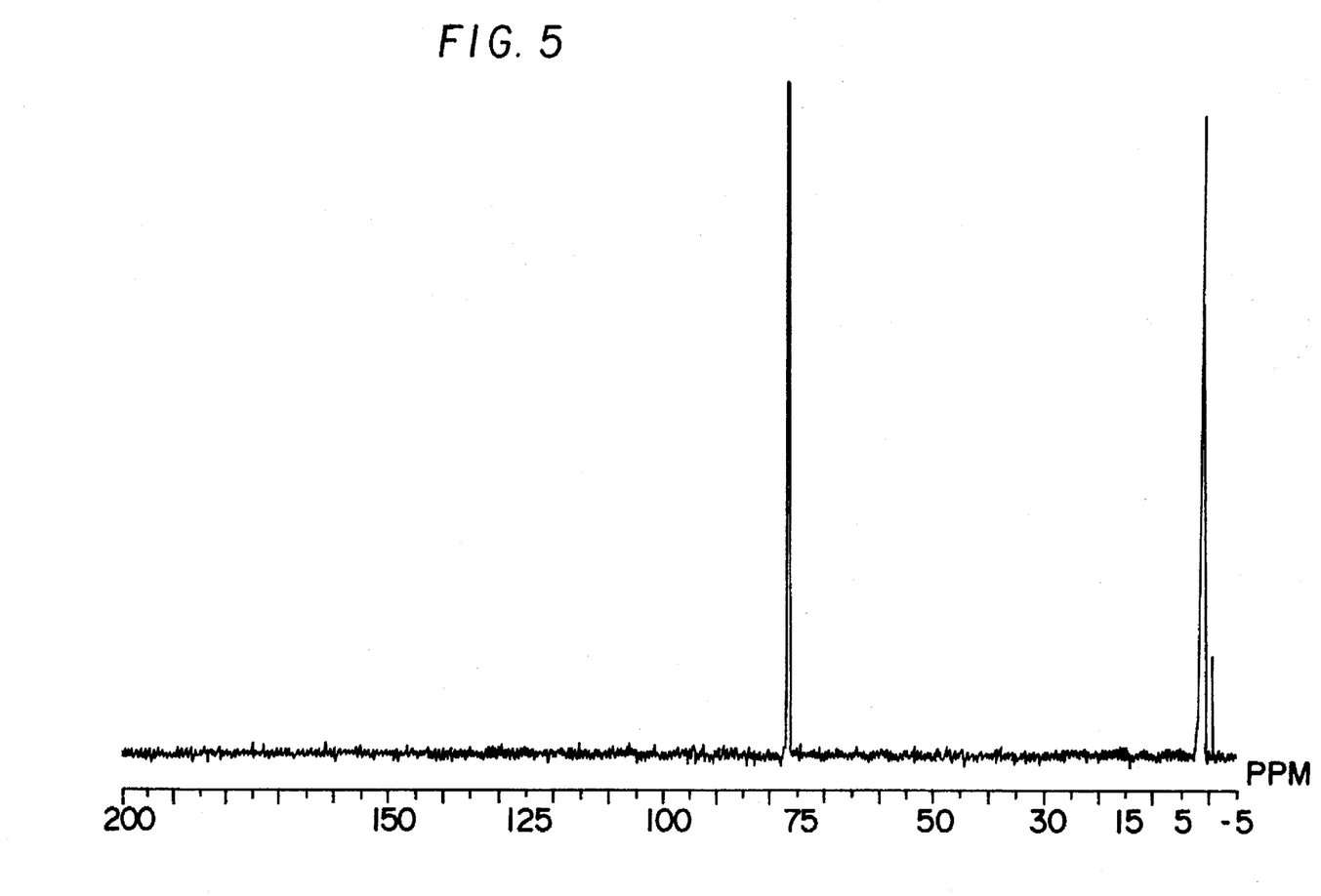
FIG. 5 is the $^{13}$C-NMR spectrum of the polyorganosilyl silicate prepared in Example 6.
Figure 6:
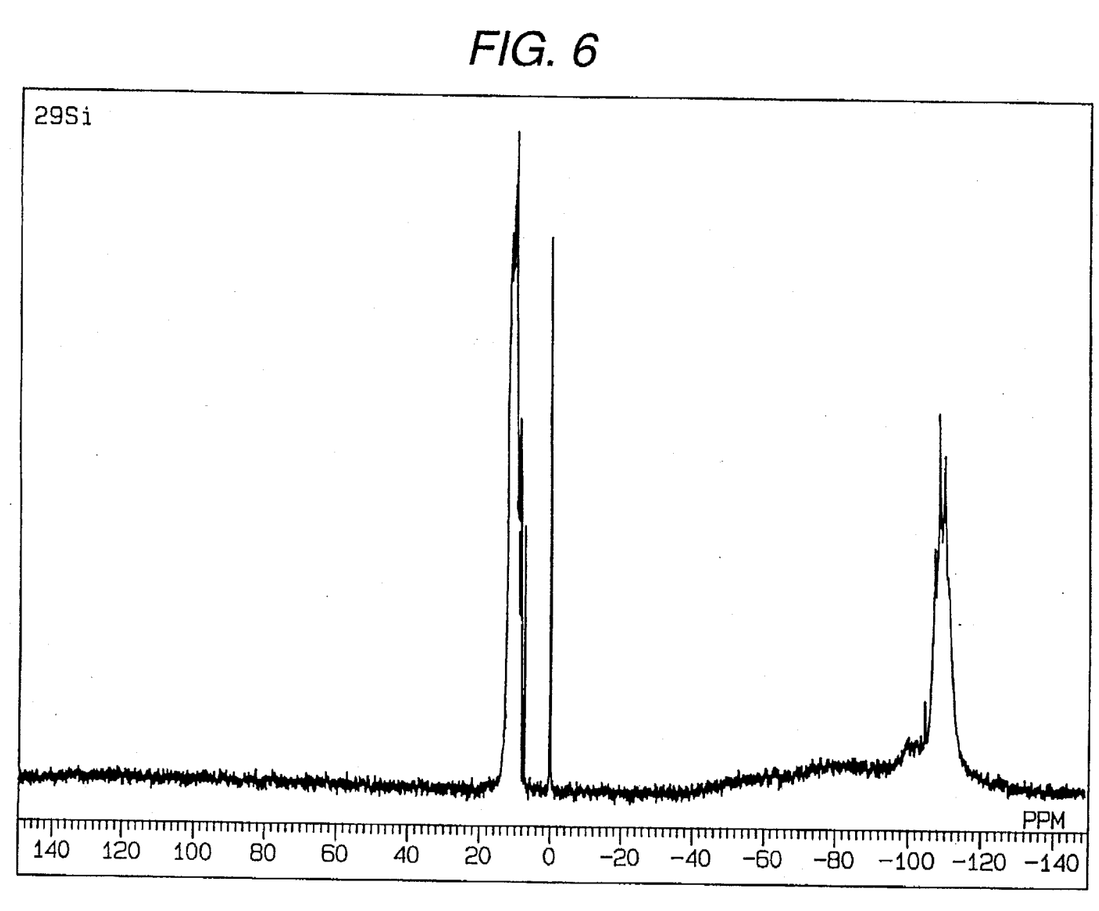
FIG. 6 is the $^{29}$Si-NMR spectrum of the polyorganosilyl silicate prepared in Example 6.

IR absorption, $^{13}$C-NMR, $^1$H-NMR and $^{29}$Si-NMR analyses of the polymers lent confirmation to the formation of polyorganosilyl silicates comprising the repeating unit represented by formula (I). The $^1$H-NMR, $^{13}$C-NMR and $^{29}$Si-NMR spectra of the polymer obtained in Example 6 are shown in FIGS. 4, 5 and 6, respectively. The main results of IR absorption, $^{13}$C-NMR, $^1$H-NMR and $^{29}$Si-NMR on the polymers obtained in Examples 6 to 10 are shown below.

1) IR Spectrum (KBr tablet method): 750, 840, 860 and 1250 cm$^{-1}$ (absorptions assigned to —CH$_3$ of silyl group); 1080–1090 cm$^{-1}$ (double absorption assigned to Si—O—Si); 2960 cm$^{-1}$ (absorption assigned to C—H of methyl group); and in the vicinity of 3400 cm$^{-1}$ (absorption assigned to OH of silanol group).

From these results and particularly from the double peak of siloxane in the vicinity of 1100 cm$^{-1}$, it was confirmed that the polyorganosilyl silicates have the repeating unit of formula (I). The double peak of siloxane has been reported in *Journal of Polymer Science*, Vol. C-1, p. 88 (1963).

2) $^{13}$C-NMR Spectrum (CDCl$_3$ solution): 1.7 ppm or 1.6 ppm (m) (signal assigned to trimethylsilyl group, —Si(CH$_3$)$_3$).

3) $^1$H-NMR Spectrum (CDCl$_3$ solution): 0.12–0.14 ppm (m) (signal assigned to methyl group).

4) $^{29}$Si-NMR Spectrum (CDCl$_3$ solution): 8–10 ppm (signal assigned to trimethylsiloxane, —OSi(CH$_3$)$_3$) and −108 to −110 ppm (signal assigned to Si(O$_{1/2}$)$_4$ bond).

Figure 7:
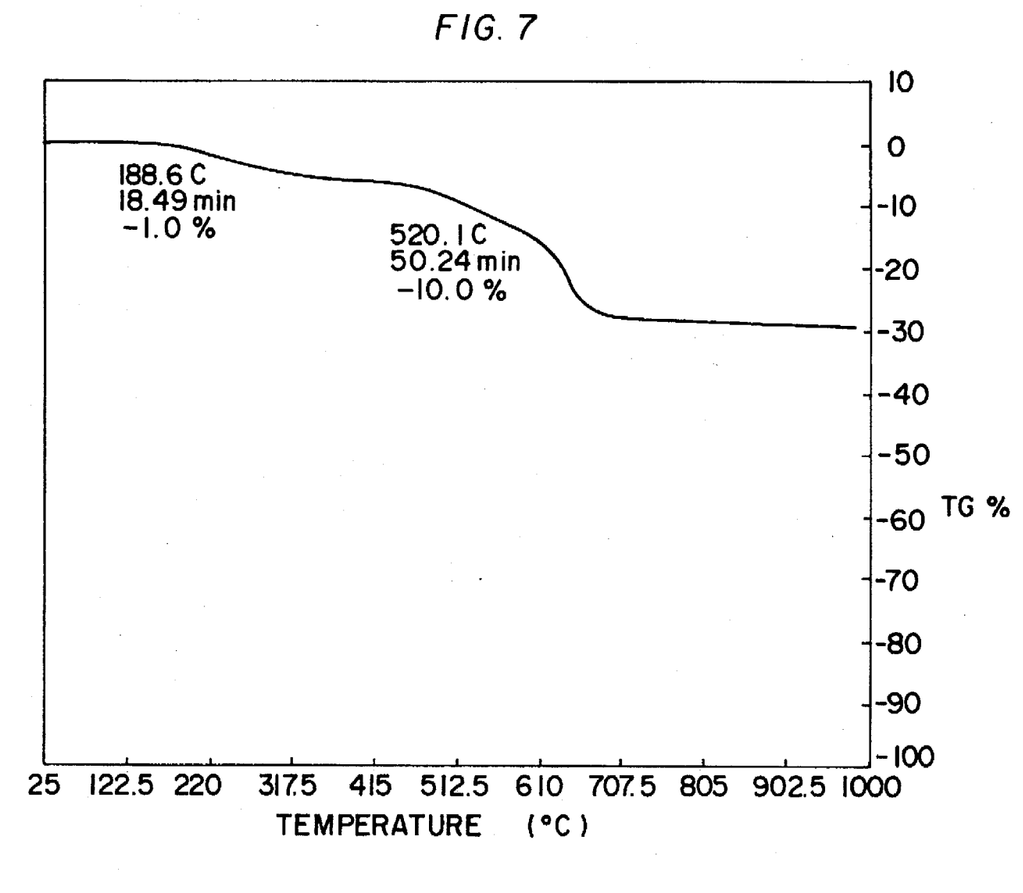
FIG. 7 is the thermogram of the polyorganosilyl silicate prepared in Example 6.

Further, each of the polymers obtained in Examples 6 to 10 was thermogravimetrically analyzed to measure the heating temperature at 10% weight loss and the weight loss on heating to 1000° C. As a result, the temperature at 10% weight loss of these polymers was between 490° and 530° C., and the weight loss on heating to 1000° C. was between 28% and 32%, verifying very high heat resistance of the polymers. As an example, the thermogram of the polymer of Example 6 is shown in FIG. 7.

Comparative Example 1

The same procedure as in Example 1 was repeated, except for replacing the purified sodium silicate aqueous solution with an aqueous solution prepared by about 3-fold diluting commercially available sodium silicate (water glass No. 3) with distilled water to have an SiO$_2$ component concentration of 9.8%. As a result, tacky polytrimethylsilyl silicate having the Mw shown in Table 2 was obtained in the yield shown.

TABLE 2

| Example No. of Purified Sodium Silicate | Amount of TMCS (g) | 5%-HCl IPA Solution (g) | Results Yield (%) | Mw (×10³) |
|---|---|---|---|---|
| Example No. | | | | |
| 6 | 1 | 40.7 | 30.4 | 99 | 145 |
| 7 | 2 | 40.7 | 30.4 | 97 | 110 |
| 8 | 3 | 40.7 | 30.4 | 94 | 56 |
| 9 | 4 | 40.7 | 30.4 | 96 | 108 |
| 10 | 5 | 40.7 | 30.4 | 95 | 98 |
| Compara. Example 1 | — | 40.7 | 30.4 | 92 | 16 |

EXAMPLE 11

In the same manner as in Examples 6 to 10, the purified sodium silicate obtained in Example 1 was re-dissolved in water to prepare an aqueous solution having an SiO₂ component concentration of 10%.

In a 1 l-volume 4-necked flask equipped with a dropping funnel, a thermometer, a condenser, and a stirring rod were charged 250 g of the above prepared aqueous solution and 150 g of methyl isobutyl ketone, and TMCS of the amount shown in Table 3 below was added thereto dropwise over 10 to 20 minutes with stirring while maintaining the mixture below 30° C. by cooling. After the addition, the stirring was continued for an additional one hour to obtain a partially silylated organic sodium silicate polymer solution.

The resulting partially silylated organic sodium silicate polymer solution was silylated by Lentz' method to obtain a polyorganosilyl silicate having an Mw of 3700 and an Mn of 2850.

EXAMPLES 12 TO 14

Purified sodium silicate obtained in the same manner as in Example 2 was re-dissolved in water to prepare an aqueous solution having an SiO₂ component concentration of 10%.

In a 1 l-volume 4-necked flask equipped with a dropping funnel, a thermometer, a condenser, and a stirring rod were charged 250 g of the above prepared aqueous solution and 150 g of toluene. TMCS of the amount shown in Table 3 below was divided into two portions, which were successively added dropwise to the flask while stirring, the first portion being added as such, and the second one being added in the form of a 10% IPA solution, each over a period of 10 to 20 minutes while maintaining the mixture below 30° C. by cooling. After the addition, the stirring was continued for an additional one hour. The resulting polymer solution was added dropwise to 10% hydrochloric acid-containing IPA of the amount shown in Table 3. After the addition, the reaction mixture was heat-treated and then worked up in the same manner as in Examples 6 to 10 to obtain a tack-free polyorganosilyl silicate having the Mw shown in Table 3 in the yield shown in Table 3. In Table 3, "degree of partial silylation" refers to the mol % of TMCS used per mol of purified sodium silicate used.

The structural analysis of the polymers obtained in Example 12 to 14 by IR absorption and ¹³C-NMR, ¹H-NMR and ²⁹Si-NMR analyses gave the same results as in Examples 6 to 10.

Comparative Example 2

The same purified sodium silicate as used in Examples 12 to 14 was silylated to the possible highest degree according to the Lentz' method described in Reference Example 1. The resulting polyorganosilyl silicate solution, which was assumed to have a degree of silylation of nearly 100%, was treated at 50° C. for 3 hours and then worked-up in the same manner as in Examples 12 to 14 to obtain a polyorganosilyl silicate. As shown in Table 3, the resulting polyorganosilyl silicate had a low molecular weight, and a desired high-molecular weight polyorganosilyl silicate was not obtained.

Comparative Example 3

The same procedure as in Example 13 was conducted, except that the whole amount of TMCS used in Example 13 was charged and then the purified sodium silicate aqueous solution was dropwise added thereto. In this procedure, insoluble matter was formed at the dropwise addition of purified sodium silicate and uniform reaction couldn't be done.

Comparative Example 4

The same procedure as in Examples 12 to 14 was conducted, except for changing the amount of TMCS as shown in Table 3. The reaction mixture underwent gelation, failing to complete uniform reaction.

TABLE 3

| | Amount of TMCS (g) | 10% HCl-IPA Solution (g) | Degree of Partial Silylation (mol %) | Results Yield (%) | MW (×10³) |
|---|---|---|---|---|---|
| Example No. | | | | | |
| 12 | 45.0 | 200 | 99.5 | 98 | 45 |
| 13 | 36.2 | 200 | 80.0 | 98 | 670 |
| 14 | 22.6 | 200 | 50.0 | 97 | 922 |
| Compara. Example No. | | | | | |
| 2 | 45.2 | | (100) | 97 | 3.4 |
| 3 | 9.1 | 200 | 20.0 | — | gelation |

EXAMPLE 15

The purified sodium silicate obtained in Example 2 was re-dissolved in water to prepare an aqueous solution having an SiO₂ component concentration of 10%.

In a 1 l-volume 4-necked flask equipped with a dropping funnel, a thermometer, a condenser, and a stirring rod were charged 250 g of the above prepared aqueous solution and 100 g of toluene, and 9.7 g of dimethyldichlorosilane was added thereto dropwise over about 5 minutes with stirring while maintaining the mixture below 30° C. by cooling. After the addition, the stirring was continued for an additional one hour to obtain a high-molecular weight partially silylated organic sodium silicate polymer solution.

The resulting polymer solution was added dropwise to 200 g of 10% hydrochloric acid-containing IPA over about 5 minutes, followed by stirring at 30° C. for 1 hour. Then, 35.4 g of trimethylethoxysilane was added thereto dropwise over about 5 minutes, followed by stirring for 2 hours. The reaction temperature was raised to about 50° C., at which the stirring was continued for 3 hours. The reaction mixture was separated into two layers in a separatory funnel, and the lower aqueous layer was discarded to recover the organic layer containing a polyorganosilyl silicate.

The organic layer was washed twice with the equivalent amount of water by shaking. The organic solvent was removed by evaporation under reduced pressure to obtain a tack-free polyorganosilyl silicate having an Mw of 342,000 in a yield of 98%.

Analysis of the resulting polymer by IR absorption, $^{13}$C-NMR, $^{1}$H-NMR and $^{29}$Si-NMR lent confirmation to the formation of polytrimethylsilyl silicate comprising the repeating unit represented by formula (I) having a dimethylsiloxane bond.

The main results of IR absorption, $^{13}$C-NMR, $^{1}$H-NMR and $^{29}$Si-NMR obtained are shown below.

1) IR Spectrum (KBr tablet method): A characteristic absorption assigned to dimethylsiloxane was observed in the vicinity of 800 cm$^{-1}$ as well as the main absorptions observed with the polyorganosilyl silicates of Examples 6 to 10.

2) $^{1}$H-NMR Spectrum (CDCl$_3$ solution): A signal assigned to the methyl proton of a dimethylsiloxane unit —OSi(CH$_3$)$_2$O— was observed in 0.08 to 0.10 ppm in addition to the main signals observed with the polyorganosilyl silicates of Examples 6 to 10.

3) $^{13}$C-NMR and $^{29}$Si-NMR Spectra: The same main signals as observed with the polyorganosilyl silicates of Examples 6 to 10 were observed.

As a result of thermogravimetric analysis, the heating temperature at 10% weight loss and the weight loss on heating to 1000° C. of the resulting polymer were 510° C. and 31%, respectively, proving very high heat resistance of the polymer.

EXAMPLE 16

In the same manner as in Example 15, the purified sodium silicate obtained in Example 2 was re-dissolved in water to prepare an aqueous solution having an SiO$_2$ component concentration of 10%.

In a 1 l-volume 4-necked flask equipped with a dropping funnel, a thermometer, a condenser, and a stirring rod were charged 250 g of the above prepared aqueous solution and 100 g of toluene, and 9.7 g of dimethyldichlorosilane was added thereto dropwise over about 5 minutes with stirring while maintaining the mixture below 30° C. by cooling. After the addition, the reaction mixture was maintained for one hour to obtain a high-molecular weight partially silylated organic sodium silicate polymer solution.

The resulting high-molecular weight partially silylated organic sodium silicate polymer solution was silylated by Lentz' method to obtain a polyorganosilyl silicate having an Mw of 56,000.

EXAMPLE 17

In the same manner as in Example 15, except for replacing 9.7 g of dimethyldichlorosilane with 15.2 g of vinyldimethylchlorosilane and replacing 35.4 g of trimethylethoxysilane with 31.2 g of trimethylchlorosilane, a polyorganosilyl silicate having an Mw of 244,000 was obtained in a yield of 96%.

Analysis of the resulting polymer by IR absorption, $^{13}$C-NMR, $^{1}$H-NMR and $^{29}$Si-NMR lent confirmation to the formation of a polyorganosilyl silicate comprising the repeating unit represented by formula (I) having a vinyldimethylsilyl group bonded.

The main results of IR absorption, $^{13}$C-NMR, $^{1}$H-NMR and $^{29}$Si-NMR obtained are shown below.

1) IR Spectrum (KBr tablet method): Characteristic absorptions assigned to —CH=CH$_2$ of the vinyldimethylsilyl group were observed at 1600 cm$^{-1}$, 1400 cm$^{-1}$, and in the vicinity of 970 cm$^{-1}$ as well as the main absorptions observed with the polyorganosilyl silicates of Examples 6 to 10.

2) $^{1}$H-NMR Spectrum (CDCl$_3$ solution): Signals assigned to —CH=CH$_2$ of the vinyldimethylsilyl group were observed at 5.65, 5.85, and 5.88 ppm in addition to the main signals observed with the polyorganosilyl silicates of Examples 6 to 10.

EXAMPLE 18

Formation of Coating Film

Two grams of the polytrimethylsilyl silicate obtained in Example 7 were dissolved in 8 g of toluene to prepare a uniform clear solution. The solution was applied on a glass plate with a No. 12 bar coater and heated at 250° C. for 1 hour to form an about 6 μm thick coating film.

The resulting coating film on the glass substrate was uniform and transparent and suffered from no cracks. The coating film had a pencil hardness (JIS K5400; load: 1 kg) of 5H or higher and a contact angle of 101° with a drop of distilled water as measured at 20° C. with a contact angle measuring device manufactured by Eruma Kogakusha.

Comparative Example 5

A coating film was formed in the same manner as in Example 18, except for using the polyorganosilyl silicate obtained in Comparative Example 1 or 2. In either case, the coating film suffered from serious cracks on being heated, failing to provide a uniform coating film.

EXAMPLE 19

Formation of Film

Two grams of the polyorganosilyl silicate obtained in Example 16 were dissolved in 8 g of acetone to prepare a uniform clear solution. The solution was applied to a Teflon plate with a No. 12 bar coater. The solvent was evaporated at room temperature, and the coating film was further dried at 80° C. for 1 hour.

The resulting coating film was peeled from the Teflon plate to obtain a film having a thickness of about 7 μm. The film had a tensile strength of 1.6 kg/mm$^2$, an elongation of 1.3%, a surface resistivity of more than $10^{16}\Omega$, and a dielectric constant (1 MHz) of 2.2.

EXAMPLE 20

Preparation of UV-Curing Coating Resin

One gram of the polyorganosilyl silicate obtained in Example 17 and 0.02 g of a photopolymerization initiator IRUGACURE 184, produced by Ciba-Geigy, Ltd., were dissolved in 9 g of a 1/1 (by weight) mixed solvent of butyl acetate and isopropyl alcohol, and the resulting solution was applied on a plate of polymethyl methacrylate ARYLITE L, produced by Mitsubishi Rayon Co., Ltd., by means of a No. 12 bar coater.

The coating film was preliminarily dried at 60° C. and then irradiated with UV light of a 160 W high-pressure mercury lamp three times under conditions of 10 m/min (about 250 mj/cm$^2$) to obtain a coating film having a thickness of about 10 μm. The coating film had a pencil hardness of 7H and an abrasion resistance of $^\Delta$H(2) 1.1 as measured in accordance with ASTM D-1044 (taper abrasion, 1 kg, 100 revolutions).

The coating film was stirred in acetone under reflux for 5 hours, and the insoluble matter was separated, purified, and dried. The gel fraction (cross linking density) of the coating film calculated from the weight of the insoluble matter was 76%.

As having been fully described and demonstrated, the present invention provides a high-molecular weight polyorganosilyl silicate having a weight-average molecular weight of not less than 30,000 which can be used as a coating material having excellent electrical characteristics required for electronic parts, wiring boards, etc., such as heat resistance, insulating properties and low dielectric constant; a coating material excellent in weather resistance, adhesion, water repellency, processability and scratch resistance and therefore applicable to various substrates including metals, plastics, and glass; or a film- or sheet-forming material. The present invention also provides an industrial process for producing the high-molecular weight polyorganosilyl silicate.

While the invention has been described in detail and with reference to specific examples thereof, it will be apparent to one skilled in the art that various changes and modifications can be made therein without departing from the spirit and scope thereof.

What is claimed is:

1. A high-molecular weight polyorganosilyl silicate having a weight-average molecular weight of 30,000 to 2,000,000 on polystyrene conversion and comprising the repeating units of formula (I):

(I)

wherein $R_1$ and $R_2$, each independently represent a hydrogen atom or a substituted silyl group represented by formula $(R_3)(R_4)(R_5)Si-$, a hydrogen atom or the substituted silyl group being selected arbitrarily in every repeating unit, wherein $R_3$ represents an alkyl group or a phenyl group, and $R_4$ and $R_5$, each independently represent an alkyl group, an alkenyl group, a phenyl group or a hydroxyl group; and the molar ratio of silanol group, wherein $R_1$ or $R_2$ is a hydrogen atom, to $(R_1+R_2)$ in the polyorganosilyl silicate is from 0/100 to 40/60, wherein said repeating units of formula (I) are bonded together through siloxane bonding to form a ladder structure, and said ladder structures are bonded together through siloxane bonding.

2. A coating material comprising a high-molecular weight polyorganosilyl silicate having a weight-average molecular weight of 30,000 to 2,000,000 on polystyrene conversion as defined in claim 1.

3. A water repellent comprising a high-molecular weight polyorganosilyl silicate having a weight-average molecular weight of 30,000 to 2,000,000 on polystyrene conversion as defined in claim 1.

4. An insulating film comprising a high-molecular weight polyorganosilyl silicate having a weight-average molecular weight of 30,000 to 2,000,000 on polystyrene conversion as defined in claim 1.

5. A high-molecular weight partially silylated organosilicic acid polymer having a weight-average molecular weight of not less than 25,000 on polystyrene conversion and a degree of silylation in the range of 40–99.8 mole %, and comprising the repeating units of formula (III):

(III)

wherein $R_1$ and $R_2$ each independently represent a hydrogen atom, a sodium atom or a substituted silyl group represented by formula $(R_6)_m(R_7)_{3-m}Si-$, the hydrogen atom, the sodium atom or the substituted silyl group being selected arbitrarily in every repeating unit and at least one of $R_1$ or $R_2$ being a substituted silyl group in a molecule but without all $R_1$ and $R_2$ groups being substituted silyl groups so that said high-molecular weight organic silicic acid polymer is partially silylated, wherein $R_6$ represents an alkyl group or an aryl group, $R_7$ represents a halogen atom or an alkoxy group, and m represents 0, 1 or 2, wherein said repeating units of formula (III) are bonded together through siloxane bonding to form a ladder structure, and said ladder structures are bonded together through siloxane bonding.

* * * * *